United States Patent
Ellis

(10) Patent No.: US 7,819,195 B2
(45) Date of Patent: Oct. 26, 2010

(54) EXTERNAL HIGH PRESSURE FLUID RESERVOIR FOR RISER TENSIONER CYLINDER ASSEMBLY

(75) Inventor: Fife B. Ellis, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 414 days.

(21) Appl. No.: 11/787,280

(22) Filed: Apr. 16, 2007

(65) Prior Publication Data
US 2007/0196182 A1 Aug. 23, 2007

Related U.S. Application Data

(63) Continuation-in-part of application No. 11/280,118, filed on Nov. 16, 2005.

(51) Int. Cl.
E21B 17/07 (2006.01)
(52) U.S. Cl. .................. 166/355; 166/367; 166/352
(58) Field of Classification Search ......... 166/353–355, 166/367, 345; 175/321
See application file for complete search history.

(56) References Cited

U.S. PATENT DOCUMENTS

| 3,599,735 | A | | 8/1971 | Slator et al. |
| 3,912,227 | A | * | 10/1975 | Meeker et al. ............... 254/271 |
| 3,970,292 | A | * | 7/1976 | Dachicourt et al. ....... 267/64.28 |
| 4,004,532 | A | | 1/1977 | Reynolds |
| 4,072,190 | A | * | 2/1978 | Raulins ....................... 166/355 |
| 4,222,341 | A | * | 9/1980 | Larsen et al. ................ 114/264 |
| 4,272,059 | A | | 6/1981 | Noerager et al. |
| 4,367,981 | A | * | 1/1983 | Shapiro .................... 405/224.2 |
| 4,379,657 | A | | 4/1983 | Widiner et al. |
| 4,432,420 | A | | 2/1984 | Gregory et al. |
| 4,537,533 | A | | 8/1985 | Hampton |
| 4,638,978 | A | * | 1/1987 | Jordan ........................ 254/228 |
| 4,721,053 | A | * | 1/1988 | Brewerton ............. 114/230.13 |
| 4,799,827 | A | * | 1/1989 | Jaqua ....................... 405/224.4 |
| 4,808,035 | A | | 2/1989 | Stanton et al. |
| 4,828,230 | A | * | 5/1989 | Steger et al. ............. 267/64.16 |
| 4,883,387 | A | * | 11/1989 | Myers et al. ............. 405/224.4 |
| 5,069,488 | A | | 12/1991 | Freyer et al. |
| 5,252,004 | A | * | 10/1993 | Butler et al. ................. 405/211 |
| 5,283,552 | A | * | 2/1994 | Sol ............................ 340/605 |

(Continued)

FOREIGN PATENT DOCUMENTS

DE 102 51 212 A1 10/2002

(Continued)

Primary Examiner—Thomas A Beach
Assistant Examiner—Matthew R Buck
(74) Attorney, Agent, or Firm—Bracewell & Giuliani

(57) ABSTRACT

A riser tensioner has inner and outer cylindrical barrels that telescopingly engage each other. A small external tank is mounted outside of the barrels for communicating a small quantity of hydraulic fluid the seals between the inner and outer barrels. The external tank allows the internal volume of the cylinder rod assembly to be used for gas storage and reduces the need for accumulators. The fluid level in the external tank is checked via a sight glass, and the tank is isolated from the cylinder assembly by a combination of check and three-way valves, which allows easier access to the working fluid, and allows the addition or removal of high pressure fluid to the system without a high pressure fluid cart.

19 Claims, 4 Drawing Sheets

U.S. PATENT DOCUMENTS

| | | |
|---|---|---|
| 5,366,324 A | 11/1994 | Arlt et al. |
| 5,658,095 A | 8/1997 | Arlt et al. |
| 5,846,028 A * | 12/1998 | Thory .................... 405/195.1 |
| 6,047,744 A * | 4/2000 | Jackson ...................... 141/21 |
| 6,554,072 B1 | 4/2003 | Mournian et al. |
| 6,585,455 B1 * | 7/2003 | Petersen et al. ......... 405/224.4 |
| 6,691,784 B1 | 2/2004 | Wanvik |
| 7,008,340 B2 * | 3/2006 | Williams et al. ............ 474/101 |
| 7,131,496 B2 * | 11/2006 | Williams et al. ............ 166/355 |

FOREIGN PATENT DOCUMENTS

| | | |
|---|---|---|
| EP | 0 349 267 A1 | 1/1990 |
| EP | 1 428 973 B1 | 6/2004 |
| GB | 2 180 619 A | 4/1987 |
| WO | 2004/013452 A1 | 2/2004 |

\* cited by examiner

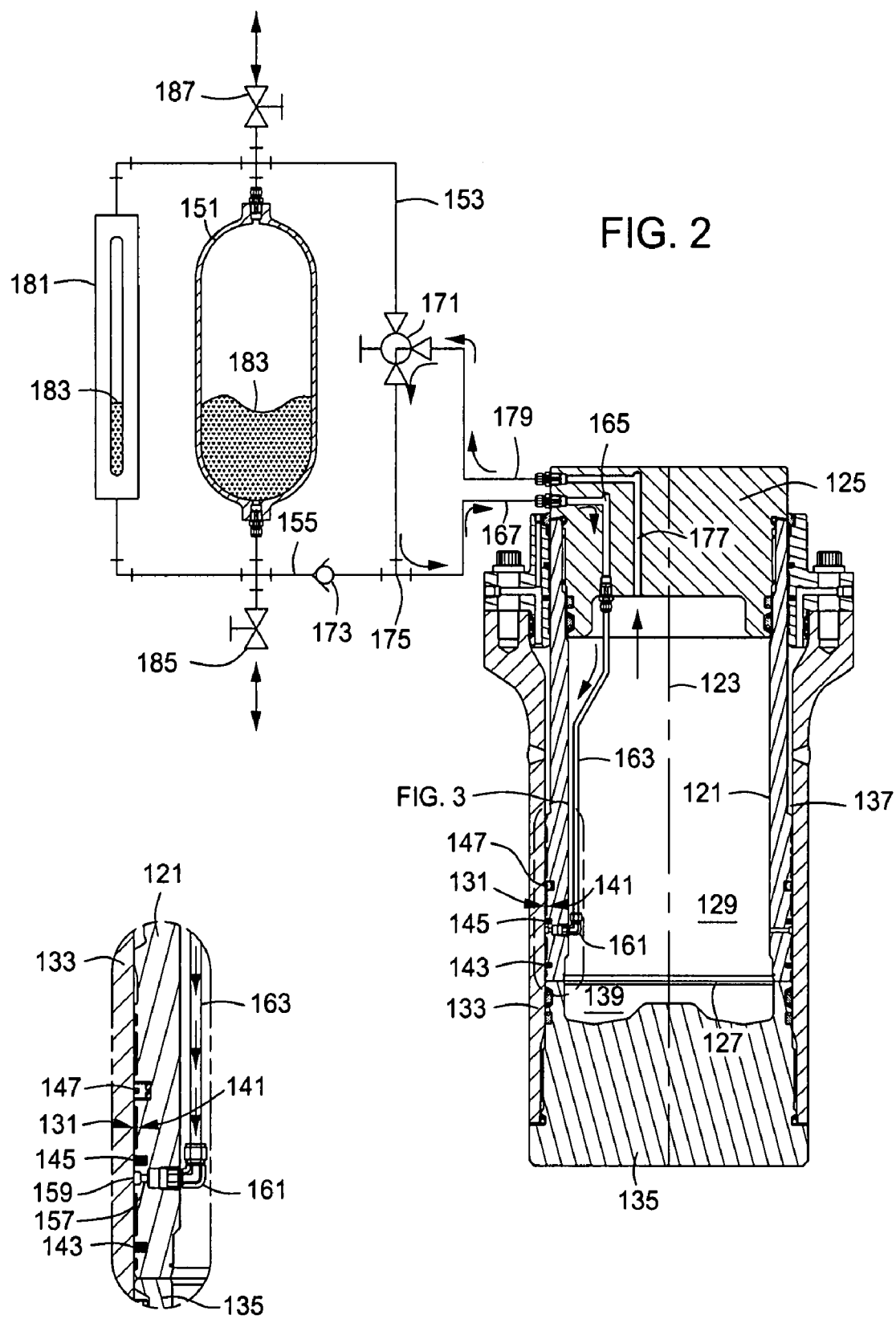

EXTERNAL HIGH PRESSURE FLUID RESERVOIR FOR RISER TENSIONER CYLINDER ASSEMBLY

This application is a continuation-in-part of U.S. patent application Ser. No. 11/280,118, filed Nov. 16, 2005, and is incorporated herein by reference.

BACKGROUND OF THE INVENTION

1. Technical Field

The present invention relates in general to riser tensioners for offshore platform drilling and production floating platforms and, in particular, to tensioner cylinder assemblies having a high pressure external fluid reservoir for lubricating seals between the cylinders.

2. Description of the Related Art

Risers are used in offshore oil and gas well production for conveying well fluids from a subsea wellhead to a floating production platform. Tensioners are employed at the platform to apply tension to the risers. A typical tensioner comprises a telescoping piston and cylinder arrangement supplied with gas pressure from accumulators. Waves and currents cause the piston and cylinder to extend and retract. Hydraulic fluid within the chamber provides lubrication.

In one type of tension design, the piston component comprises a barrel that slidingly engages the cylinder or other barrel. Each barrel has a closed end and an open end, the open ends being in fluid communication with each other. The interiors of the barrels serve as the chamber for receiving gas pressure. By combining the interior of each barrel, the volume of the chamber may be sufficient to eliminate external accumulators or at least reduce the size of external accumulators. A larger internal volume improves the cylinder stiffness versus stroke characteristics. However, provisions must be made for lubrication of the primary seals, and the hydraulic fluid reduces the amount of volume that can be filled with gas.

SUMMARY OF THE INVENTION

One embodiment of a system, method, and apparatus for a riser tensioner has inner and outer cylindrical barrels that telescopingly engage each other. An external fluid reservoir or tank is mounted outside of the barrels for communicating a small quantity of hydraulic fluid or other media to the working or dynamic seals between the inner and outer cylinder barrels. By using a small external reservoir, the internal volume of the cylinder rod assembly is made available for storage of nitrogen gas or compressed air. By increasing the internal gas volume of the cylinder rod, a "softer" cylinder is employed which has the positive effect of reducing or eliminating the need for external storage tanks or accumulator-type devices.

The external reservoir also offers a service improvement in that the cylinder fluid level is easily checked by using a sight glass or calibrated liquid level gage. Another improvement of the invention is that the reservoir is readily isolated from the cylinder assembly by a combination of check and three-way valves. This improvement allows easier access to the working fluid and allows the addition or removal of high pressure fluid to the system without the requirement of a high pressure fluid cart.

In one embodiment, the cylinder assembly uses a fluid filled tube or hose that is connected to a radial port and annular groove in the piston end of a cylinder rod. The opposite end of the hose or tube is connected to a top cap of the cylinder assembly and communicates with the gas inside the cylinder. Inlet and outlet ports are located at the top cap to allow gas communication with the interior and fluid communication with the annular groove in the cylinder assembly. A line leading from the gas outlet port of the cylinder is connected to a three-way isolation valve. The other port is connected to a tee and an in-line check valve. Under normal operation, the cylinder gas pressure and the fluid pressure in the piston end of the cylinder are in communication and are under the same pressure, with the exception of the small "head" pressure that is generated by the elevation change between the piston seals and external reservoir via the fluid specific gravity.

The small external reservoir is connected to the ports leading from the three-way isolation valve and check valve. One of the valves allows high pressure gas bleed off from the external reservoir. Fill and drain valves allow the addition or removal of fluid from the tank. Filling or draining the tank is accomplished without a high pressure fluid cart by simply positioning the three-way isolation valve such that the pressure is routed back to the cylinder, which will allow the external reservoir to be bled down and vented to atmosphere. The annular groove in the cylinder rod communicates with a radial hole or port and allows the high pressure fluid to access the primary and secondary seals. A zero differential pressure seal below the annular groove prevents fluid leakage due to the effect of gravity.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

FIG. 2 is a sectional view of one embodiment of a riser tensioner having a gas and fluid system shown in an operational position and is constructed in accordance with the invention;

FIG. 3 is an enlarged sectional view of a portion of the riser tensioner system of FIG. 2 and is constructed in accordance with the invention;

DETAILED DESCRIPTION OF THE INVENTION

Figure 1:
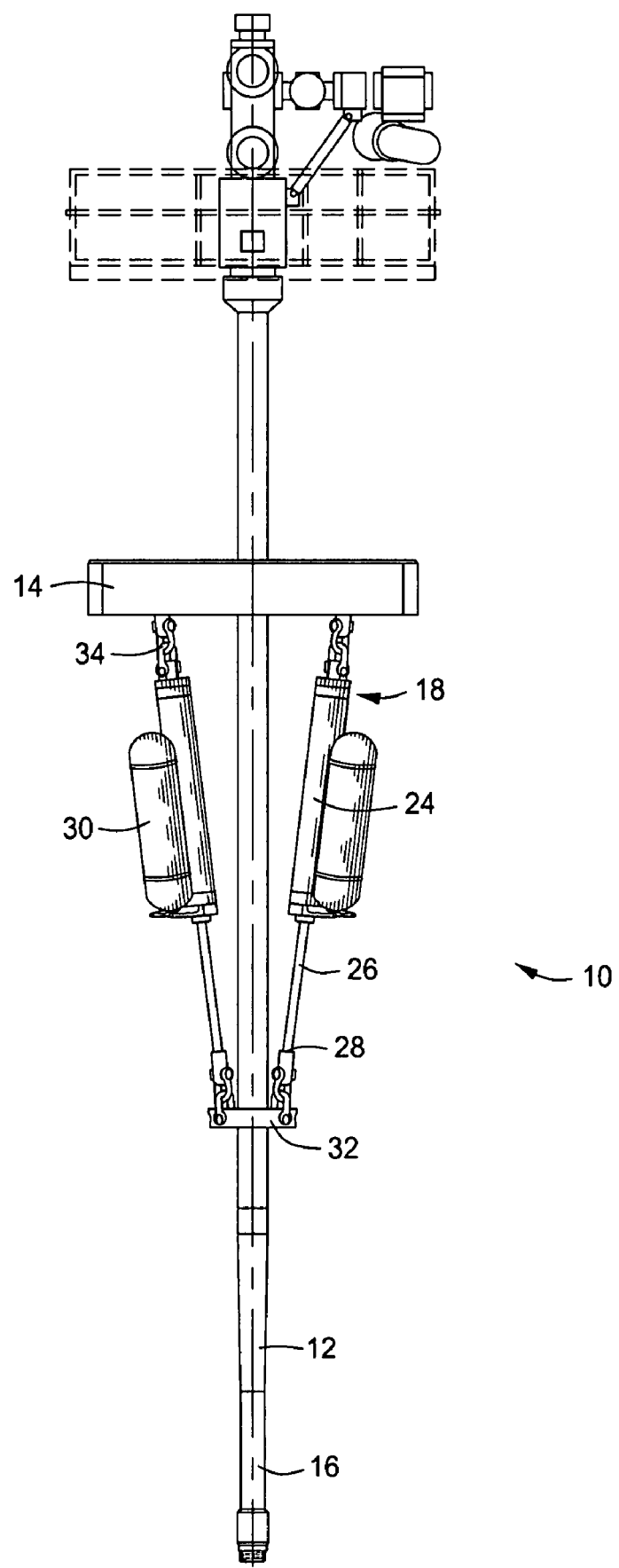
FIG. 1 is a partial sectional view of one type of floating platform with a riser supported by a tensioning mechanism constructed in accordance with the invention.

Referring to FIG. 1, one type of riser tensioning mechanism 10 is depicted. Although mechanism 10 is depicted as a "pull-up" type, one skilled in the art will recognize that the present invention is equally suitable for "push-up" type and other types of tensioning mechanisms.

A riser 12 extends downwardly from a platform 14 to a subsea wellhead (not shown). Riser 12 has a longitudinal axis 16 and is surrounded by a plurality of hydraulic cylinders 18. Each hydraulic cylinder 18 has a cylinder housing 24 having a chamber (not shown). A piston rod 26 has a rod end 28 that extends downward from each cylinder housing 24 and hydraulic cylinder 18. The piston ends of rods 26 opposite rod ends 28 are disposed within the respective chambers (not shown) of cylinder housings 24. Hydraulic fluid (not shown) is contained within the housing 24 for pulling piston rods 26 upward. Each hydraulic cylinder 18 also may comprise an accumulator 30 for accumulating hydraulic fluid from hydraulic cylinder 18 and for maintaining high pressure on the hydraulic fluid. A riser collar 32 rigidly connects to riser 12. The piston rods 26 attach to riser collar 32 at the rod ends 28. Cylinder shackles 34 rigidly connect cylinder housings 24 to platform 14.

In operation, the riser tensioning mechanism 10 pulls upward on riser 12 to maintain tension therein. Riser collar 32 connects to riser 12 and engages riser 12 below platform 14 and cylinder receiver 18. Hydraulic fluid pressure is applied to hydraulic cylinders 18 so that riser 12 is maintained in constant tension. Riser collar 32 supports the weight of riser 12 in order to create a tensional force in riser 12. Hydraulic cylinders 18 automatically adjust to changes in platform 14 position to allow for relative movement between riser 12 and platform 14. In the event of a failure in one of the four hydraulic cylinders 18, the remaining hydraulic cylinders 18 will continue to support riser 12 in tension without excessive bending moments being applied to the hydraulic cylinders 18.

Figure 4:
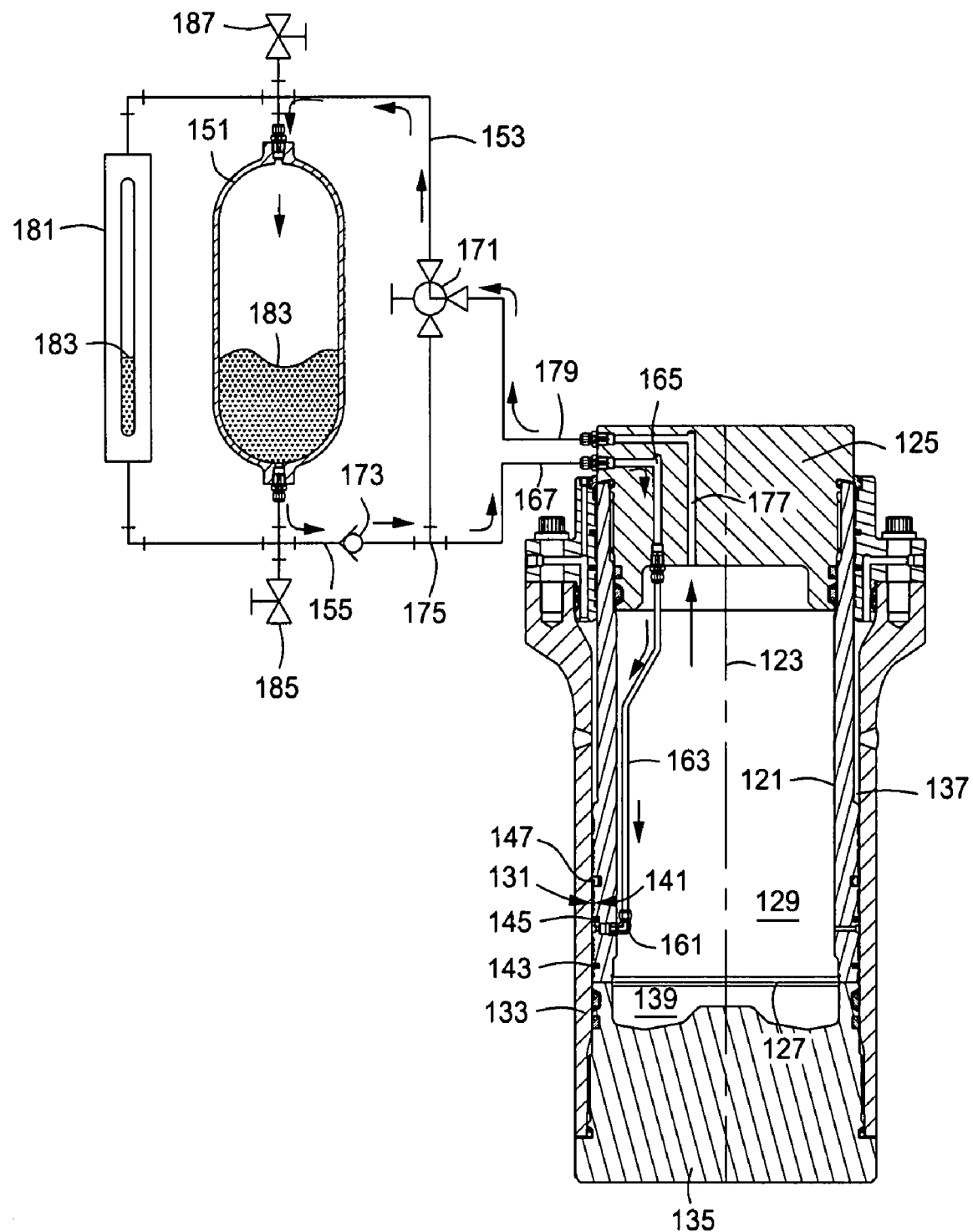
FIG. 4 is a sectional view of the riser tensioner of FIG. 2 with the gas and fluid system shown in a position for accessing the reservoir and is constructed in accordance with the invention.

Referring to FIGS. 2-4, one embodiment of a system and apparatus for a tensioner for applying tension to a subsea member extending to a floating offshore structure is disclosed. In the illustrated embodiment, the cylinder assembly 118 comprises an inner cylindrical barrel 121 (i.e., piston) having an axis 123, a closed end 125 (e.g., top cap), an open end 127, an interior 129, and an exterior surface 131. An outer cylindrical barrel 133 has a closed end 135, an open end 137, and an interior 139 in which the inner barrel 121 is coaxially located to define a chamber 129, 139 therebetween. The outer barrel 133 also has an interior surface 141 that closely receives the exterior surface 131 of the inner barrel 121 such that the inner and outer barrels 121, 133 telescopingly engage each other at an interface 131, 141.

A series of seals, such as high pressure dynamic fluid and gas seals, are located at the interface to seal between the inner and outer barrels 121, 133. In one embodiment, the seals comprise a zero differential pressure seal 143 adjacent the open end 127 of the inner barrel 121, a primary seal 145 axially spaced apart from the zero differential pressure seal 143, and a secondary seal 147 axially spaced apart from the primary seal 145 and opposite the zero differential pressure seal 143 relative to the primary seal 145.

The invention also comprises a small, high pressure, external reservoir or tank 151. In one embodiment, tank 151 comprises a volume of about 4 gallons and is detached from and located remotely relative to the inner and outer barrels 121, 133. A gas conduit 153 extends from tank 151 to the chamber 129, 139 for communicating gas therebetween. In addition, a hydraulic fluid conduit 155 extends from the tank 151 to the interface 131, 141 for communicating hydraulic fluid therebetween.

In one embodiment, the hydraulic fluid conduit 155 extends through the closed end 125 of the inner barrel 121 to a radial fluid passage 157 (FIG. 3) in the inner barrel 121 adjacent the open end 127 of the inner barrel 121. The radial fluid passage 157 is axially located between the zero differential pressure seal 143 and the primary seal 145. The inner barrel 121 has a circumferential annular groove 159 in the outer surface 131 that is axially aligned with the radial fluid passage 157.

The hydraulic fluid conduit 155 may further comprise a fluid fitting 161 mounted in the radial fluid passage 157. An interior fluid tube or hose 163 extends from the fluid fitting 161 to the closed end 125 of the inner barrel 121. An axial and radial passage 165 extends through the closed end 125 of the inner barrel 121 from the interior fluid tube 163 to an exterior of the closed end 125 of the inner barrel 121. An exterior fluid tube 167 extends from the axial and radial passage 165 to the external tank 151.

As shown in the illustrated embodiment, the invention further comprises a three-way isolation valve 171 that is located in the gas conduit 153 between the external tank 151 and the chamber 129, 139. A check valve 173 is located in the hydraulic fluid conduit 155 between the external tank 151 and the interface 131, 141. A tee fitting 175 is located between the check valve 173, the interface 131, 141, and the three-way isolation valve 171 for fluid communication therewith. The gas conduit 153 may further comprise an axial and radial passage 177 extending through the closed end 125 of the inner barrel 121 from the chamber 129, 139 to an exterior of the closed end 125 of the inner barrel 121, and an external gas tube 179 extending between the axial and radial passage 177 and the three-way valve 171.

The tank 151 also may further comprise a liquid level indicator 181, such as a gage, sight glass, etc., connected to the external tank 151 for visibly indicating a level 183 of hydraulic fluid contained within the external tank 151. The tank 151 also may incorporate a fluid valve 185 for directly replenishing and draining the external tank 151 with hydraulic fluid, and a gas valve 187 for directly replenishing and draining the external tank 151 with gas.

Figure 5:
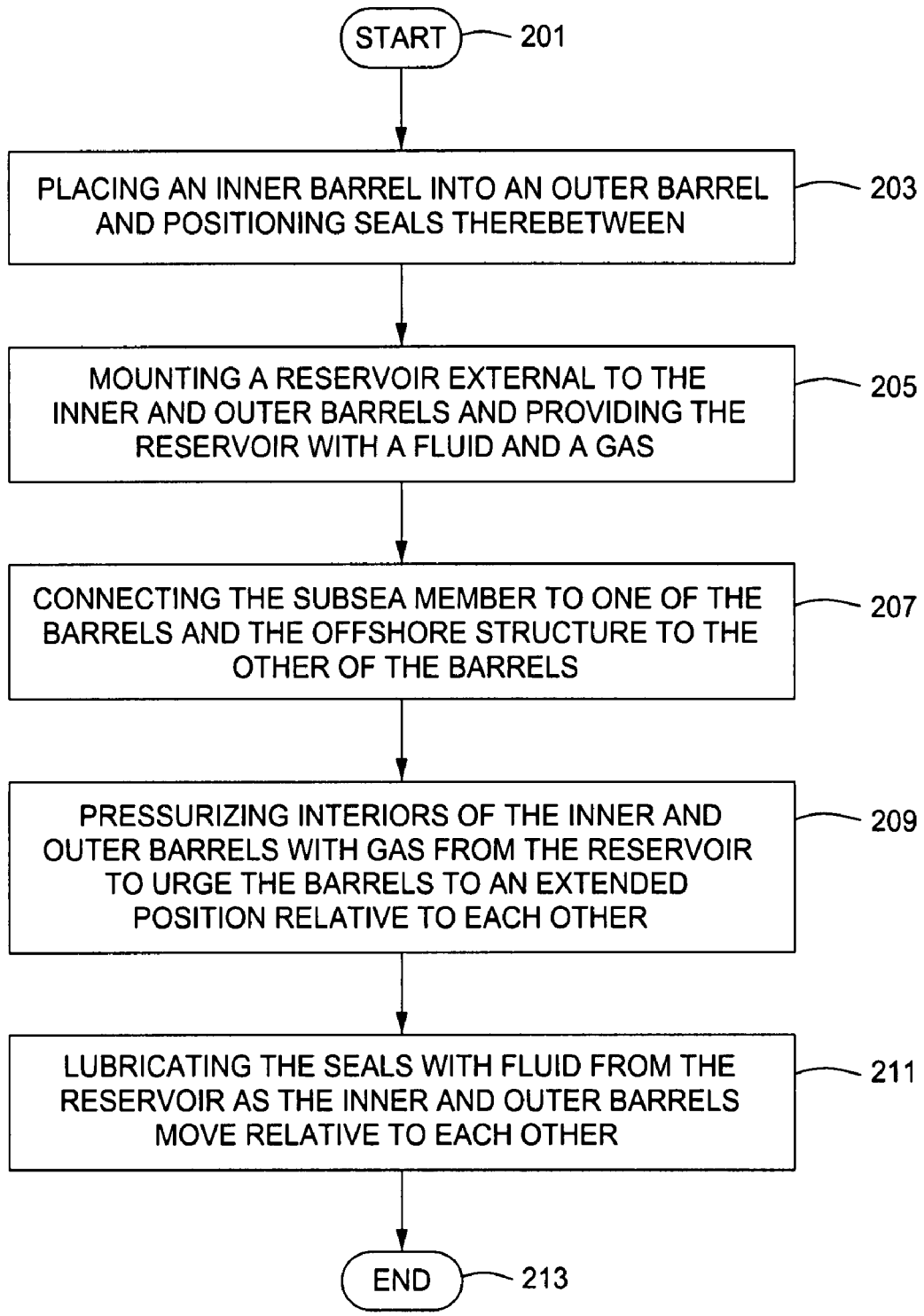
FIG. 5 is a high level flow diagram of one embodiment of a method in accordance with the invention.

Referring now to FIG. 5, one embodiment of a method of applying tension to a subsea member extending to a floating offshore structure is shown. The method begins as indicated at step 201, and comprises placing an inner barrel into an outer barrel and positioning seals therebetween (step 203); mounting a reservoir external to the inner and outer barrels and providing the reservoir with a fluid and a gas (step 205); connecting the subsea member to one of the barrels and the offshore structure to the other of the barrels (step 207); pressurizing interiors of the inner and outer barrels with gas from the reservoir to urge the barrels to an extended position relative to each other (step 209); lubricating the seals with fluid from the reservoir as the inner and outer barrels move relative to each other (step 211); before ending as indicated at step 213.

The method may comprise introducing hydraulic fluid axially between the zero differential pressure seal and the primary seal, and providing the inner barrel with a circumferential annular groove in the outer surface for circumferentially dispersing the hydraulic fluid about the inner and outer barrels. The method also may further comprise controlling flow of the gas between the reservoir and the interiors and controlling flow of the fluid between the reservoir and the interiors with a three-way isolation valve between the gas in the reservoir and the interiors, a check valve between the fluid in reservoir and the seals, a tee fitting between the check valve, the three-way isolation valve and the seals for fluid communication therewith.

The seals may be lubricated from the reservoir by closing the three-way isolation valve to the tee fitting such that gas pressure from the interiors forces fluid from the reservoir, through the check valve and the tee fitting to the seals, and directly accessing the gas and fluid in the reservoir from an exterior of the reservoir by closing the three-way isolation valve to the reservoir such that gas pressure from the interiors is isolated from the reservoir and limited to the tee fitting and the seals, such that the reservoir is vented to atmosphere to be replenished with or drained of gas and fluid through separate valves. In addition, the method may further comprise visually detecting a fluid level inside the reservoir with a liquid level indicator located outside of reservoir.

While the invention has been shown or described in only some of its forms, it should be apparent to those skilled in the art that it is not so limited, but is susceptible to various changes without departing from the scope of the invention.

What is claimed is:

1. A tensioner for applying tension to a subsea riser extending to a floating offshore structure, comprising:
   inner and outer barrels telescopingly engaging each other, one of the barrels adapted to be mounted to the offshore structure and the other to the riser to apply tension to the riser;
   a primary seal on an exterior wall surface of the inner barrel that slidingly and sealingly engages an inner wall of the outer barrel, defining a chamber within an interior of the inner barrel containing a gas under pressure, the primary seal having a high pressure side that is exposed to the gas under pressure within the chamber;
   an exterior reservoir containing a lubricant mounted external to the inner and outer barrels;
   a lubricant port extending through a sidewall of the inner barrel and having an outlet on the high pressure side of the primary seal;
   a lubricant conduit extending from the exterior reservoir into the chamber to the lubricant port for supplying lubricant to the primary seal; and
   a gas conduit extending from the chamber to the exterior reservoir, the gas conduit communicating the pressure of the gas in the chamber to the lubricant in the exterior reservoir.

2. The tensioner according to claim 1, wherein:
   each of the barrels has an open end and a closed end; the outlet of the lubricant port is between the open end of the inner barrel and the primary seal.

3. The tensioner according to claim 2, wherein the outlet comprises a circumferential annular groove in the exterior wall surface.

4. The tensioner according to claim 2, wherein the portion of the lubricant conduit within the chamber is offset from an axis of the inner and outer barrels.

5. The tensioner according to claim 1, further comprising:
   an isolation valve located in the gas conduit between the exterior reservoir and the chamber, the isolation valve having a closed position that blocks gas within the chamber from flowing into the reservoir; and
   a check valve located in the lubricant conduit to prevent lubricant in the lubricant conduit from flowing back into the reservoir.

6. The tensioner according to claim 1, wherein the gas conduit extends from one end of the reservoir, and the lubricant conduit extends from an opposite end of the reservoir.

7. The tensioner according to claim 1, wherein the reservoir has an upper and a lower end, and the tensioner further comprises a fluid level indicator having one fluid line leading to the upper end of the reservoir and another, fluid line leading to the lower end of the reservoir, the fluid level indicator comprising a vertically oriented tube connected to the fluid lines that visibly indicates a level of lubricant contained in the vertically oriented tube.

8. A riser tensioner assembly, comprising:
   an inner barrel having an axis, a closed end, an open end, an interior, and an exterior surface;
   an outer barrel having a closed end, an open end, an interior in which the inner barrel is coaxially located to define a chamber therebetween, and an interior surface closely receiving the exterior surface of the inner barrel such that the inner and outer barrels telescopingly engage each other at an interface;
   a primary seal located at the interface that seals between the inner and outer barrels;
   the chamber containing a gas under pressure, the primary seal having a high pressure side exposed to the gas under pressure;
   a lubricant port extending through a sidewall of the inner barrel and having an outlet on the exterior of the inner barrel between the open end of the inner barrel and the primary seal;
   an external tank detached, from the inner and outer barrels and containing a lubricant;
   a lubricant conduit leading from the external tank through the chamber to the lubricant port; and
   a gas conduit leading from the chamber to the external tank, the gas conduit communicating gas ressure from the chamber to the lubricant in the external tank.

9. The tensioner assembly according to claim 8, wherein the gas and the lubricant in the external tank are in physical contact with each other.

10. The tensioner assembly according to claim 8, wherein the lubricant conduit extends to a lower end of the external tank, and the gas conduit extends to an upper end of the external tank.

11. The tensioner assembly according to claim 8, wherein the portion of the lubricant conduit within the chamber comprises an interior lubricant tube extending through the chamber from the lubricant passage to a closed end of the inner barrel, the lubricant tube being offset from an axis of the inner and outer barrels.

12. The tensioner assembly according to claim 8, further comprising:
    an isolation valve located in the gas conduit between the external tank and the chamber that is selectively closed to block gas flow to the external tank.

13. The tensioner assembly according to claim 8, wherein the primary seal is mounted to an exterior surface of the inner barrel.

14. The tensioner assembly according to claim 8, further comprising a liquid level indicator connected to the external tank for visibly indicating a level of lubricant contained within the external tank, the liquid level indicator comprising a visual indicator tube external of the external tank, the visual indicator tube having an upper end in fluid communication with gas contained in the external tank and a lower end in fluid communication with lubricant contained in the external tank.

15. A method of applying tension to a subsea riser extending to a floating offshore structure, comprising:
    placing an inner barrel into an outer barrel and positioning a primary seal therebetween;
    providing a lubricant port through a sidewall of the inner barrel, the lubricant port having an outlet on an exterior of the inner barrel located between the primary seal and an open end of the inner barrel;
    mounting a reservoir external to the inner and outer barrels and providing the reservoir with a lubricant;

connecting a conduit from the reservoir into interiors of the inner and outer barrels and to an inlet of the lubricant port;

connecting the subsea riser to one of the barrels and the offshore structure to the other of the barrels;

pressurizing the interiors of the inner and outer barrels with gas to urge the barrels toward an extended position relative to each other, thereby applying tension to the riser;

communicating gas from the interiors of the inner and outer barrels to the reservoir to apply a pressure to the lubricant contained in the reservoir that is substantially the same as in the interiors of the inner and outer barrels; and lubricating the primary seal by flowing lubricant from the reservoir through the conduit and lubricant port to the vicinity of the primary seal and on a side of the primary seal exposed to the gas.

16. The method according to claim 15, wherein the gas and the lubricant in the reservoir are in physical contact with each other.

17. The method according to claim 15, further comprising replenishing lubricant in the reservoir by blocking the gas from flowing into the reservoir, then venting the reservoir to reduce the pressure of the reservoir to atmospheric, then dispensing lubricant into the reservoir.

18. The method according to claim 15, wherein:

flowing the lubricant comprises flowing the lubricant from a lower end portion of the reservoir; and communicating gas to the reservoir comprises flowing the gas into an upper end of the reservoir.

19. The method according to claim 15, further comprising visually detecting a lubricant level inside the reservoir with a liquid level indicator located outside of reservoir, the liquid level indicator comprising a visual indicating tube having a level of lubricant therein that corresponds to the level of lubricant inside the reservoir.

* * * * *

UNITED STATES PATENT AND TRADEMARK OFFICE
CERTIFICATE OF CORRECTION

| | |
|---|---|
| PATENT NO. | : 7,819,195 B2 |
| APPLICATION NO. | : 11/787280 |
| DATED | : October 26, 2010 |
| INVENTOR(S) | : Ellis |

Page 1 of 1

It is certified that error appears in the above-identified patent and that said Letters Patent is hereby corrected as shown below:

In Column 5, Line 46, in Claim 3, delete "claim 2," and insert -- claim 1, --, therefor.

In Column 6, Line 22, in Claim 8, delete "detached," and insert -- detached --, therefor.

In Column 6, Line 27, in Claim 8, delete "ressure" and insert -- pressure --, therefor.

Signed and Sealed this
Eighth Day of February, 2011

David J. Kappos
*Director of the United States Patent and Trademark Office*